United States Patent
Cananzi et al.

(10) Patent No.: US 12,367,168 B1
(45) Date of Patent: Jul. 22, 2025

(54) HIGH-SPEED DIMM SLOT TERMINATOR

(71) Applicant: Astera Labs, Inc., Santa Clara, CA (US)

(72) Inventors: David A. Cananzi, Santa Clara, CA (US); Long Yang, Pleasanton, CA (US); Liang Xue, Los Altos, CA (US)

(73) Assignee: Astera Labs, Inc., Santa Clara, CA (US)

( * ) Notice: Subject to any disclaimer, the term of this patent is extended or adjusted under 35 U.S.C. 154(b) by 52 days.

(21) Appl. No.: 18/378,523

(22) Filed: Oct. 10, 2023

(51) Int. Cl.
*G06F 13/40* (2006.01)
*G06F 1/18* (2006.01)

(52) U.S. Cl.
CPC ............ *G06F 13/409* (2013.01); *G06F 1/183* (2013.01)

(58) Field of Classification Search
None
See application file for complete search history.

(56) References Cited

U.S. PATENT DOCUMENTS

| | | | | |
|---|---|---|---|---|
| 6,266,252 | B1 * | 7/2001 | Karabatsos | H05K 1/029 710/301 |
| 7,937,537 | B2 * | 5/2011 | Bandholz | G06F 15/16 710/316 |
| 2022/0418093 | A1 * | 12/2022 | Kopp | H05K 3/0005 |

* cited by examiner

*Primary Examiner* — Tim T Vo
*Assistant Examiner* — Dayton Lewis-Taylor
(74) *Attorney, Agent, or Firm* — Shield Intellectual Property PC; Kirk D. Wong (57) ABSTRACT

A motherboard implementing a T-topology bus architecture between a host controller and two or more DDR5 DIMM slots is combined with one or more DIMM terminator cards installed in at least one of the DDR5 DIMM slots to increase the performance of DDR5 DIMM memory accesses.

18 Claims, 10 Drawing Sheets

(12) United States Patent

HIGH-SPEED DIMM SLOT TERMINATOR

TECHNICAL FIELD

Embodiments relate generally to computing system memory devices, and, more specifically, to techniques for improving throughput performance in memory expansion devices.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Modern computer architecture has evolved from single-purpose CPU boards to modular and configurable motherboards. Along with the evolution of motherboards, Random Access Memory (RAM) packaging has progressed from board-mounted memory devices to user-installable Dual In-line Memory Modules (DIMMs). Synchronous Dynamic RAMs (SDRAMs) are mounted on a DIMM and the DIMM is inserted into a DIMM slot on the motherboard.

Current motherboard architecture implements Double Data Rate (DDR) as the bus protocol and interface for data transfer between the CPU and the DIMM slots. DDR enables fast access to the memory modules on the DIMMs by the CPU. DDR has progressed from DDR, DDR2, DDR3, DDR4, to DDR5, with each succeeding version being a performance increase over the previous version. DDR5 is currently the highest in overall performance.

BRIEF DESCRIPTION OF THE DRAWINGS

The present inventive subject matter is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present inventive subject matter. It will be apparent, however, that the present inventive subject matter may be practiced without these specific details. In other instances, well-known structures and devices are shown in block diagram form in order to avoid unnecessarily obscuring the present inventive subject matter.

Embodiments are described herein according to the following outline:

1.0 General Overview
2.0. Functional Overview
3.0. Implementation Mechanism—Hardware Overview
4.0. Extensions and Alternatives

1.0. GENERAL OVERVIEW

This overview presents a basic description of some aspects of a possible embodiment of the present invention. It should be noted that this overview is not an extensive or exhaustive summary of aspects of the possible embodiment. Moreover, it should be noted that this overview is not intended to be understood as identifying any particularly significant aspects or elements of the possible embodiment, nor as delineating any scope of the possible embodiment in particular, nor the invention in general. This overview merely presents some concepts that relate to the example possible embodiment in a condensed and simplified format and should be understood as merely a conceptual prelude to a more detailed description of example possible embodiments that follows below.

The DDRx protocols specify how the address and data buses between the host controller (CPU) and the DIMM are configured and operate, as well as the DIMM slot size and pin layout. The current version is DDR5. The buses give the host controller access to the SDRAM on the DIMM. In applications where the memory bus arrangement is variable (e.g., a server motherboard, configurable memory expander module, etc.) DIMM are used. However, the configurability comes at a cost. The platform (e.g., the motherboard) must operate in as many configurations as possible where different DIMM configurations may load the buses excessively and degrade bus performance (maximum bus speed).

When dealing with high-speed DDR such as DDR5, a problem occurs when dual DIMM slots are used. Regardless of the DIMM configuration, the connectors for the modules are always present on the printed circuit board (PCB). Empty DIMM slots create an electrical stub, which causes signal reflections on the bus. Loaded DIMM slots introduce capacitive loading from the SDRAM IC.

When the buses are designed using a typical fly-by or daisy chain topology, the capacitive loading from a dual DIMM module configuration can be so significant that a dual DIMM bus has difficulty performing at the speed of a singly loaded bus. The signal reflection caused by the capacitive loading distorts signals on the bus and decreases the performance of the bus.

In an embodiment, a motherboard is configured with a T-topology bus structure between the host controller and two DIMM slots. A DIMM module that is a passive termination card includes a plurality of resistors that act as a load for each of the data lines in the DIMM slot. The DIMM module is placed in one of the two DIMM slots on the motherboard when a single DIMM memory module is used in the other DIMM slot of the two DIMM slots.

In an embodiment, a motherboard is configured with a T-topology bus structure between the host controller and two DIMM slots. A DIMM module that is an active termination card includes a control circuit to approximate an SDRAM IC for each of the data lines in the DIMM slot. The DIMM module is placed in one of the two DIMM slots on the motherboard when a single DIMM memory module is used in the other DIMM slot of the two DIMM slots.

2.0. FUNCTIONAL OVERVIEW

Figure 1:
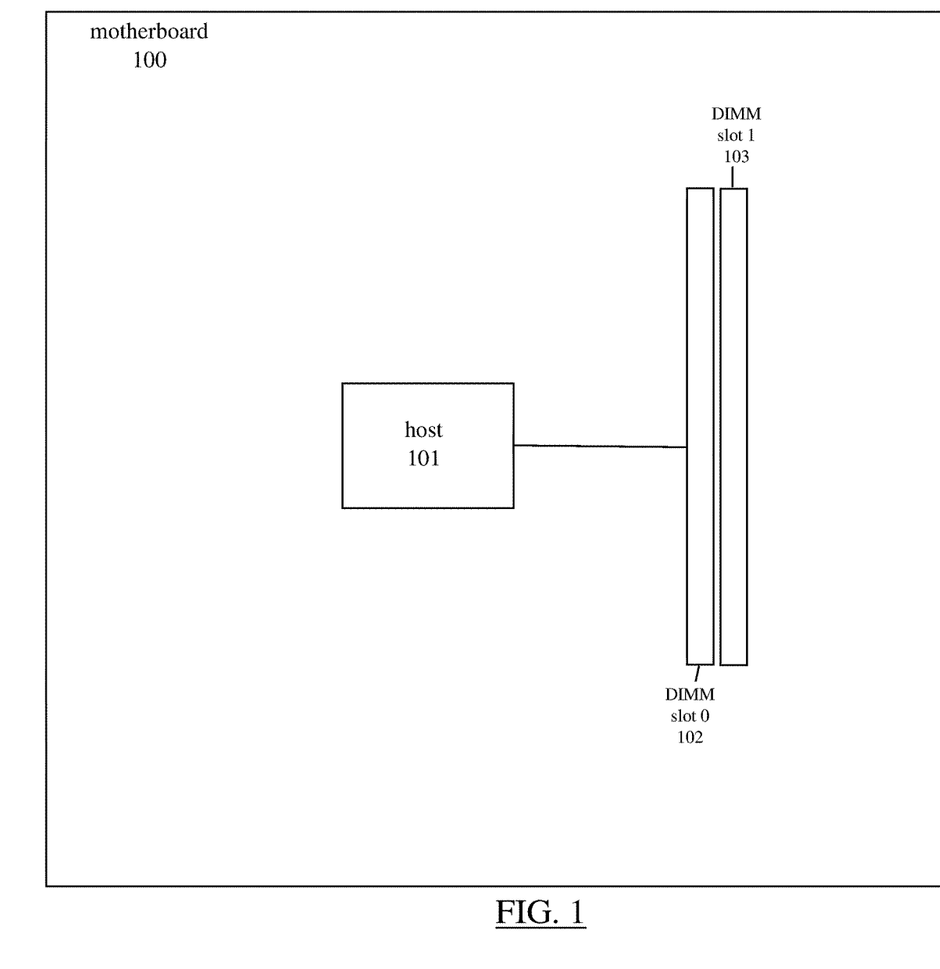
FIG. 1 illustrates an example motherboard having a plurality of DIMM slots.

FIG. 1 illustrates a mother board 100 having a host controller 101 and two DIMM slots. The bus trace layout scheme between the host controller 101 and DIMM slot 0 102 and DIMM slot 1 103 is typically a fly-by topology or a T-topology. Fly-by topology has a daisy chain structure where the command, address, and clock signals are routed directly from the host controller 101 to the DIMM slots 102, 103, which, in turn, are connected to the SDRAM devices on a DIMM inserted into the DIMM slot. Fly-by topology is preferred in DDR3 and DDR4 because of the signal integrity provided by the continuous traces.

When fly-by topology is used in DDR5 and the farthest DIMM slot from the host controller 101 is populated, while the closest DIMM slot is not populated, a negligible stub is created at existing DDR5 data-rates, resulting in negligible signal degradation.

T-topology routes the command, address, and clock signals in a branch fashion from the host controller 101 to the DIMM slots 102, 103. T-topology is typically used when using memory down, where the memory devices are soldered directly to the PCB and are not removable. In that situation, T-topology works better than fly-by topology.

Figure 2A:
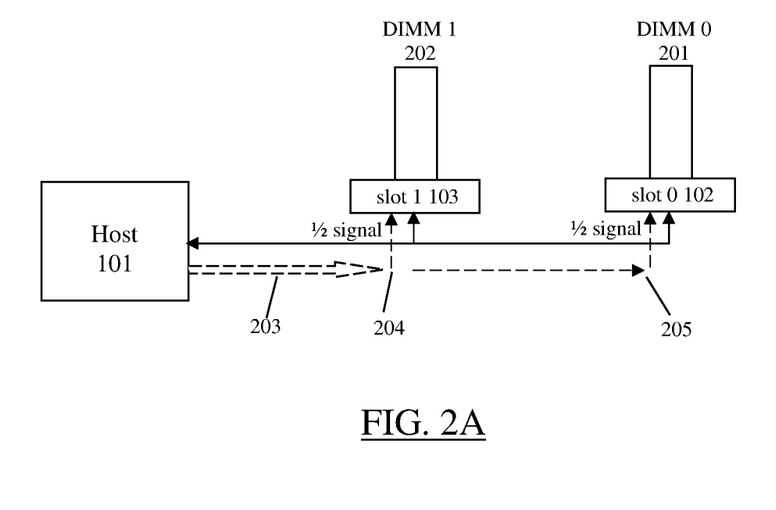
FIGS. 2A-2C illustrate motherboard topology examples.

Referring to FIG. 2A, a bus layout using fly-by topology is shown. The signal 203 from the host controller 101 is sent through the bus to the DIMM slots 102, 103. In this example, both slot 0 102 and slot 1 103 are populated with DIMM 0 201 and DIMM 1 202, respectively. In an ideal situation, as signal 203 travels down the bus, ½ of the signal 204 is received by DIMM 1 202 and ½ of the signal 205 is received by DIMM 0 201. Some amount of the main signal 203 is lost at each branch from the main bus.

Figure 2B:
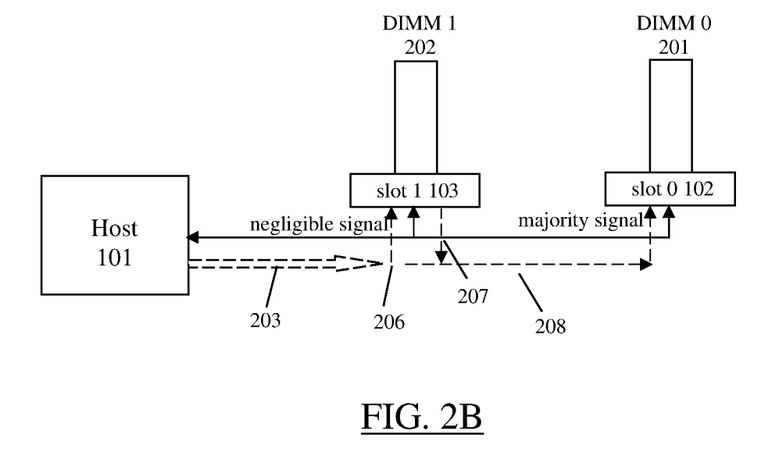

Referring to FIG. 2B, a bus layout using fly-by topology with signal reflection is shown. The signal 203 from the host controller 101 is sent through the bus to the DIMM slots 102, 103. In this example, both slot 0 102 and slot 1 103 are populated with DIMM 0 201 and DIMM 1 202, respectively. As in FIG. 2A, as signal 203 travels down the bus, as part of the signal is received by DIMM 1 202, a portion of the signal is reflected 207 back to the remainder of the main signal 208 as the signal travels to DIMM 0 201. This is due to the capacitance load of DIMM 1 201. The reflected signal 207 causes some distortion of signal 208 because reflected signal 207 is out of phase from signal 208, which degrades the performance of the bus.

In another example, if slot 1 103 is left empty, even more signal reflection is caused by the stub created by the empty DIMM socket in slot 1 103. Reflected signal 207 would be greater than in the previous example and would cause more distortion to signal 208, thereby causing greater performance degradation.

Figure 2C:
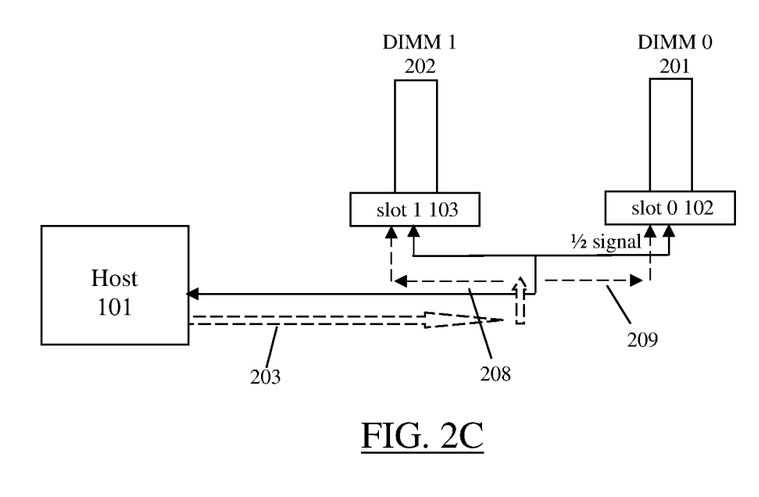

Referring to FIG. 2C, a bus layout using T-topology is shown. When T-topology is used, the signal 203 is split in a more balanced fashion such that ½ of the main signal 208 is distributed to DIMM 1 202 and ½ of the main signal 209 is distributed to DIMM 0 201. The result is a cleaner signal because reflected signals are minimal. T-topology is more complex than fly-by topology and requires more layout time and routing space on the PCB.

Fly-by topology was preferred in DDR3 and DDR4 because it can handle the high 64-bit signaling rate demands of the bus while T-topology was considered inadequate for the speed demands of DDR3 and DDR4 due to the trace stubs created by the T-topology. DDR5 is different from DDR3 and DDR4 because it requires two independent 32-bit channels versus the 64-bit data channel of DDR3 and DDR4, allowing for higher data rates over smaller bus sizes. Thus, T-topology can handle DDR5 speeds.

In an embodiment, in conjunction with a motherboard implementing T-topology DDR5 bus architecture, a DIMM terminator card is used to occupy a DIMM slot when only one DIMM is desired for system operation. The terminator provides a resistive path to the bus bias voltage (generated on the DIMM terminator). The DIMM terminator card can be passive or active. When the DIMM terminator card is inserted into a DIMM slot, it appears to the host controller that there is loaded DIMM in the slot. This allows a T-topology to be implemented with minimal impact on signal reflection or stubs.

Figure 3:
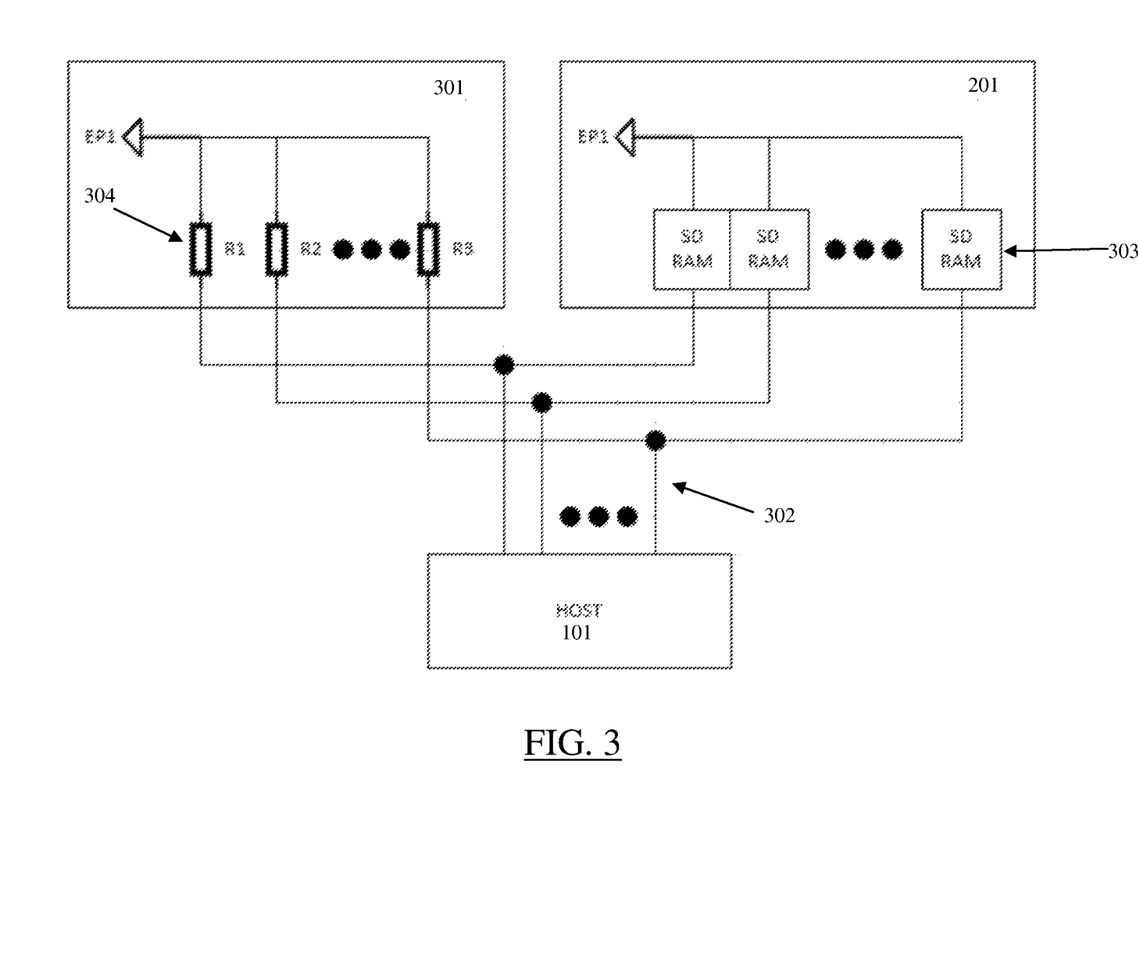
FIG. 3 illustrates an example passive DIMM terminator card attached to a host controller via a T-topology bus, according to an embodiment.

Referring to FIG. 3, passive DIMM terminator card 301 is connected to a host controller 101 via a T-topology bus 302 is shown. With a normal DIMM 201 inserted into slot 0 102, the host controller 101 communicates with the SDRAM devices 303 on the DIMM 201 via bus 301.

In an embodiment, the passive DIMM terminator card 301 includes a plurality of resistors 304 that load the bus 301 and appear as a DIMM on the bus load of bus 302. The passive DIMM terminator card 301 can be packaged much like a normal DIMM in order for users to properly insert or remove the passive DIMM terminator card from a DIMM slot/receptacle. In this example, passive DIMM terminator card 301 is inserted into slot 1 103. The signal from host controller 101 across bus 302 is split between the DIMM 201 and the passive DIMM terminator card 301. The passive DIMM terminator card 301 improves the performance of the bus 302 by eliminating the stub created when no DIMM is present. This improves the overall performance of the computer system by enabling faster SDRAM access speeds for DIMM 201.

In an embodiment, a serial presence detect (SPD) (not shown) is incorporated in the passive DIMM terminator card 301 that informs the host controller 101 that a termination DIMM is connected. JEDEC specification JESD300-5 outlines the SPD/hub requirements and JESD400-5A outlines the SPD contents. JESD400-5A can be programmed to inform the host controller 101 that the passive DIMM terminator card 301 contains devices that are compatible with, for example, DDR5 SDRAM. In this application with the passive DIMM terminator card 301, there is no memory on the passive DIMM terminator card 301, but the host controller 101 will consider it as DDR5 compatible. For example, in byte 2 of the status register, a value of 0x12 is used to indicate "DDR5 SDRAM". Byte 4 may be set to 0b00000 for "No memory; not defined". Other bytes can be configured to inform host controller 101 the correct I/O width, bank grouping, nominal VDDQ for termination purposes, etc.

In an embodiment, passive DIMM terminator card 301 incorporates a power management IC (PMIC) that allows the voltage output for VQQD to be programmable (biasing). This means that the output voltage can be adjusted higher or lower than nominal. The host controller 101 can access the PMIC, via the SPD hub to set:

Margin Voltage
    In a memory test system, the bias voltage from the PMIC can be increased to replicate the range of voltages that a hub system may see.

Trim Voltage
    In the general case, there can be a DIMM with memory and a passive DIMM terminator card 301 installed.

For more accurate termination, the bias voltage of the passive DIMM terminator card 301 can be changed to match the voltage of the memory DIMM.

Figure 4:
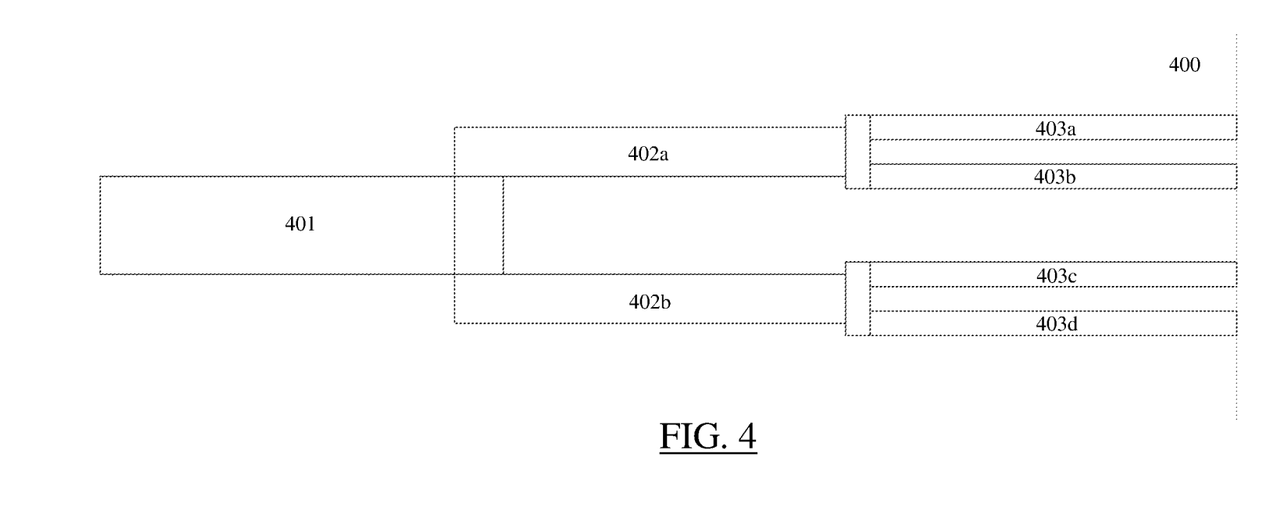
FIG. 4 illustrates an example balanced T-topology multi-DIMM per channel layout, according to an embodiment.

In an embodiment, multiple DIMMs may be implemented per channel. Referring to FIG. 4, a balanced T-topology multi-DIMM per channel bus layout allows multiple chip selects from the host controller 101. In this example, the T-topology bus architecture splits into more balanced segments. In an embodiment, the T-topology bus architecture is laid out on a motherboard. The challenge is making the trace width thin enough. A stack-up 400 is selected to use the minimum width of ~2.0 mil traces 403a-403d for a 200 Ohm impedance, followed by 4 mil traces 402a-402b for a 100 Ohm impedance, and then an 8 mil trace 401 for 50 Ohm. The traces taper to increase the impedance. The branching T-topology section can be limited to within ¼ wavelength, which is about 34 mm for high-speed FR-4. The long sections of the branches need to meet the memory controller requirements, but each parallel segment should be length matched.

Figure 5:
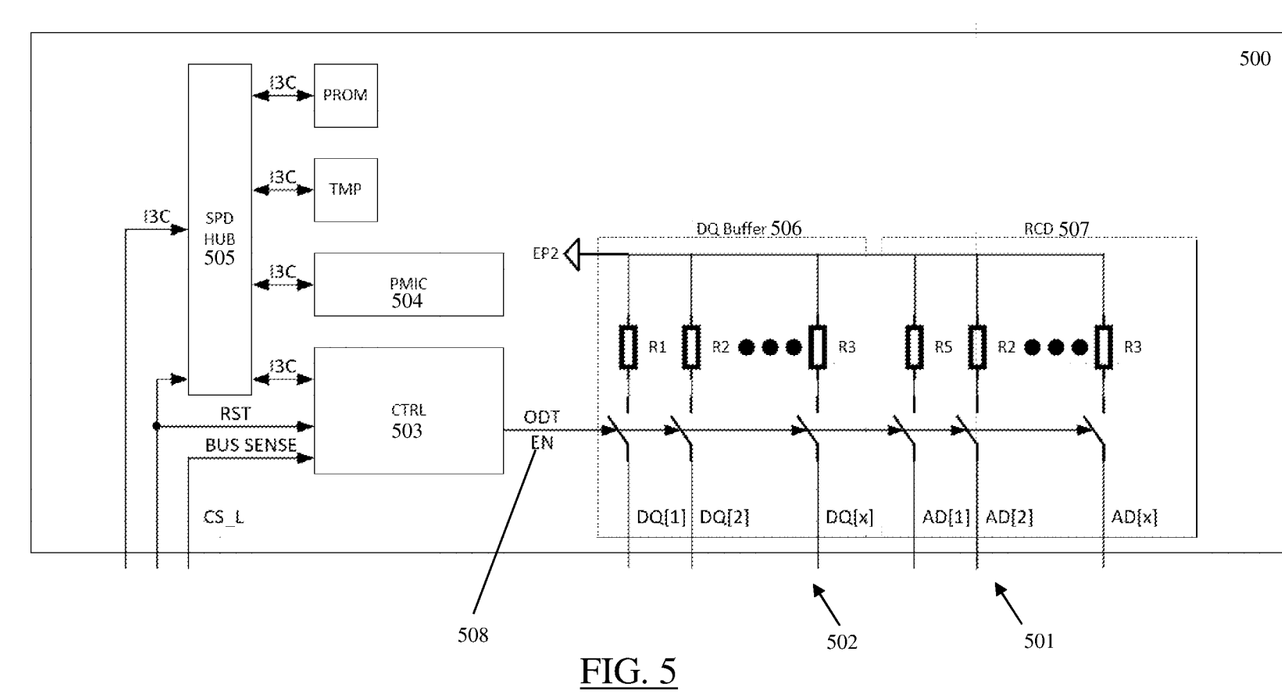
FIG. 5 illustrates an example active DIMM terminator, according to an embodiment.

Referring to FIG. 5, an active DIMM terminator card 500 is shown. The active DIMM terminator card 500 is more complex than the passive DIMM terminator card 301 but allows for more JEDEC features which would allow for power savings and better approximate an SDRAM IC bus load. In an embodiment, active DIMM terminator card 500 includes a DDR5 SPD hub 505 which allows for full DDR5 sideband interface. A PMIC 504 regulates power required by the components of the active DIMM terminator card 500. Bus sense controller 503 controls the active termination for the data lines. Registering Clock Drivers (RCD) buffer 507 buffers the Command Address (CA) bus, chip selects, and clock lines 501 between the host controller and the SDRAMs. Data (DQ) buffer 506 buffers the data lines 502. The termination can be actively controlled by the bus sense controller 503 via control line 508. The bus sense controller 503 can follow JEDEC guidelines for low power mode, termination settings, etc. The SPD hub 505 manages communications between the bus sense controller, the PMIC 504, and other devices in the active DIMM terminator card 500. The active DIMM terminator card 500 improves the performance of the bus and the overall performance of the computer system by enabling faster SDRAM access speeds for an opposite-installed DIMM. Note that in an embodiment, passive DIMM terminator card 301 has a similar SPD and PMIC layout as shown in FIG. 5.

Figure 6:
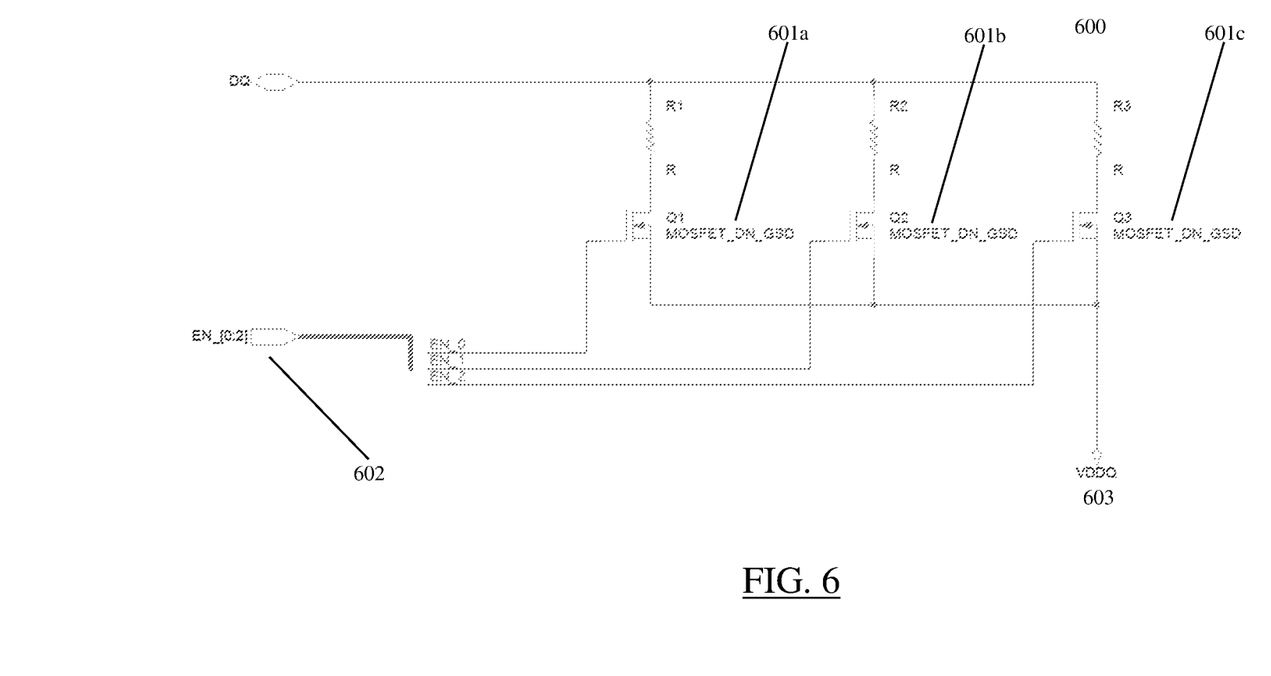
FIG. 6 illustrates an example configurable active DIMM termination circuit, according to an embodiment.

In an embodiment, a configurable active termination circuit allows a DIMM terminator card to have any termination combination. Referring to FIG. 6, configurable DIMM terminator card 600 incorporates multiple variable resistor circuits using high-speed transistors 601a-601c. Register 602 controls the high-speed transistors 601a-601c to adjust the termination voltage to VDDQ 603. Host controller 101 can load values into register 602 to control the VQQD 603 output to control the level of termination. Additionally or alternatively, a value in register 602 may be preset at the point of manufacture and optionally modified by host controller 101 or another source. In general, DDR5 has eight combinations of terminations, but technically more are possible.

A DIMM terminator card does not require a complex tuning algorithm which means that there is no need for Command/Address training or DQ/DQS training as with standard DIMMs with memory. There is also less circuitry in a DIMM terminator card than a standard DIMM with memory, so there is little voltage or temperature shift. Command/Address, DQ/DQS, and drift tuning is required for the standard DIMM with memory, but not for the DIMM termination card. For example, termination tuning may be achieved in a fly-by topology by tuning the nearer DIMM to a weaker termination and the further DIMM to a stronger termination. In a balanced T-topology, both DIMMs can have the same termination level. In an example, host controller 101 can start with the weakest setting, e.g., 260 Ohms, applied to all DIMMs (in this case one DIMM with memory and a configurable DIMM terminator card 600). Host controller 101 can keep decreasing the termination values until an improvement is no longer seen on the memory DIMM.

The embodiments discussed herein allow the motherboard to reach its optimal speed potential in both the dual DIMM and single DIMM cases in light of the increased speed demands of DDR5 over other DDRx versions. Note that the embodiments discussed herein can be used for future DDR5+ implementations or other memory bus approaches.

In an embodiment, a switch could disconnect the unused DIMM connector from the bus, however an isolator switch may introduce more signal degradation in the nominal case.

In an embodiment, a switch integrated on the motherboard could be used to route the data lines from a slot to a termination channel integrated on the motherboard.

Figure 7:
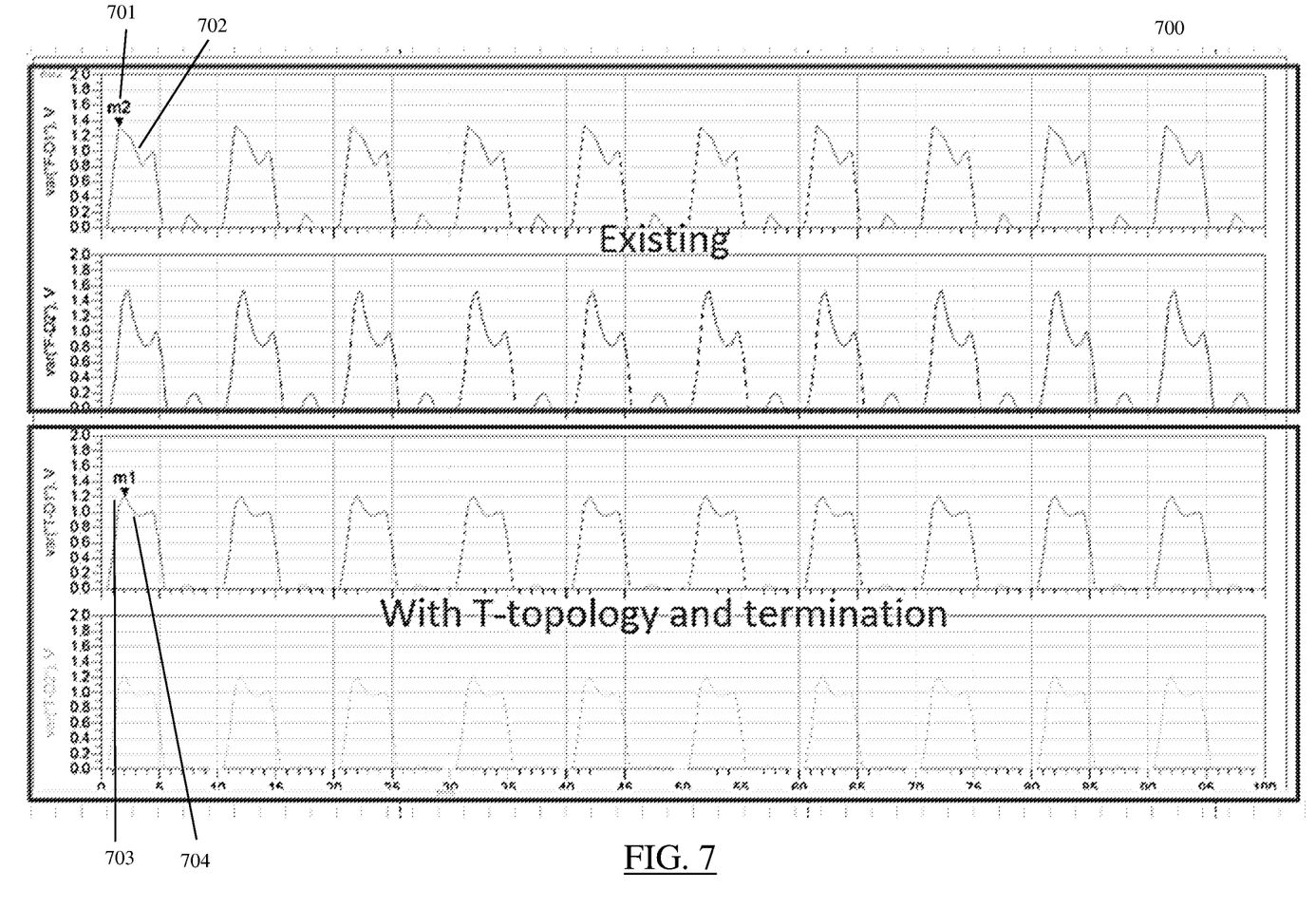
FIG. 7 illustrates an example simulation signal comparison chart, according to an embodiment.

FIG. 7 illustrates an example simulation signal comparison chart 700. The signal trace for a DDR5 fly-by topology implementation with no termination (one DIMM installed in the furthest slot and an empty slot) 701 shows a degradation of the signal 702. When compared to the trace for a T-topology implementation with a passive terminator card installed 703, the amount of signal degradation 704 is much less than the signal degradation 702 of the fly-by topology.

In an embodiment, the active and passive DIMM termination cards combined with the T-topology bus in a DDR5 system show a significant improvement over the fly-by topology in a DDR5 system.

Note that, although separate embodiments are discussed herein, any combination of embodiments and/or partial embodiments discussed herein may be combined to form further embodiments.

3.0. IMPLEMENTATION MECHANISM—HARDWARE OVERVIEW

According to one embodiment, the techniques described herein are implemented by one or more special-purpose computing devices. The special-purpose computing devices may be desktop computer systems, portable computer systems, handheld devices, networking devices, or any other device that incorporates hard-wired and/or program logic to implement the techniques. The special-purpose computing devices may be hard-wired to perform the techniques, or may include digital electronic devices such as one or more application-specific integrated circuits (ASICs) or field programmable gate arrays (FPGAs) that are persistently programmed to perform the techniques. Such special-purpose computing devices may also combine custom hard-wired logic, ASICs, FPGAs, or other circuitry with custom programming to accomplish the techniques.

Though certain foregoing techniques are described with respect to a hardware implementation, which provides a number of advantages in certain embodiments, it will also be recognized that, in other embodiments, the foregoing techniques may still provide certain advantages when performed partially or wholly in software. Accordingly, in such an embodiment, a suitable implementing apparatus comprises a general-purpose hardware processor and is configured to perform any of the foregoing methods by executing program instructions in firmware, memory, other storage, or a combination thereof.

Figure 8:
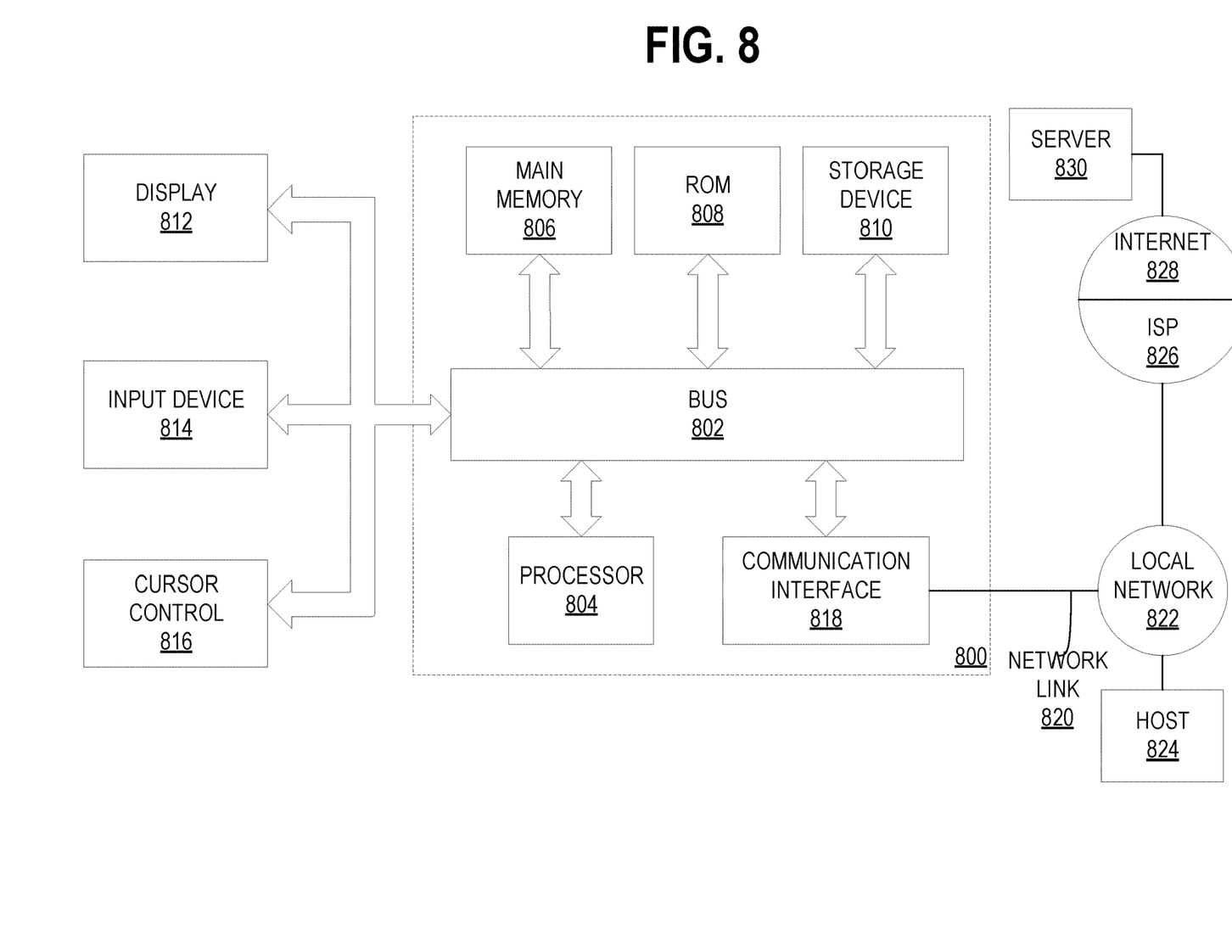
FIG. 8 is a block diagram of a computer system upon which embodiments of the inventive subject matter may be implemented.

FIG. 8 is a block diagram that illustrates a computer system 800 that may be utilized in implementing the above-described techniques, according to an embodiment. Computer system 800 may be, for example, a desktop computing device, laptop computing device, tablet, smartphone, server appliance, computing mainframe, multimedia device, handheld device, networking apparatus, or any other suitable device. In an embodiment, FIG. 8 is a different view of the devices and systems described in previous sections.

Computer system 800 may include one or more ASICs, FPGAs, or other specialized circuitry 803 for implementing program logic as described herein. For example, circuitry 803 may include fixed and/or configurable hardware logic blocks for implementing some or all of the described techniques, input/output (I/O) blocks, hardware registers or other embedded memory resources such as random-access memory (RAM) for storing various data, and so forth. The logic blocks may include, for example, arrangements of logic gates, flip-flops, multiplexers, and so forth, configured to generate an output signals based on logic operations performed on input signals.

Additionally, and/or instead, computer system 800 may include one or more hardware processors 804 configured to execute software-based instructions. Computer system 800 may also include one or more busses 802 or other communication mechanism for communicating information. Busses 802 may include various internal and/or external components, including, without limitation, internal processor or memory busses, a Serial ATA bus, a PCI Express bus, a Universal Serial Bus, a HyperTransport bus, an Infiniband bus, and/or any other suitable wired or wireless communication channel.

Computer system 800 also includes one or more memories 806, such as a RAM, hardware registers, or other dynamic or volatile storage device for storing data units to be processed by the one or more ASICs, FPGAs, or other specialized circuitry 803. Memory 806 may also or instead be used for storing information and instructions to be executed by processor 804. Memory 806 may be directly connected or embedded within circuitry 803 or a processor 804. Or, memory 806 may be coupled to and accessed via bus 802. Memory 806 also may be used for storing temporary variables, data units describing rules or policies, or other intermediate information during execution of program logic or instructions.

Computer system 800 further includes one or more read only memories (ROM) 808 or other static storage devices coupled to bus 802 for storing static information and instructions for processor 804. One or more storage devices 810, such as a solid-state drive (SSD), magnetic disk, optical disk, or other suitable non-volatile storage device, may optionally be provided and coupled to bus 802 for storing information and instructions.

A computer system 800 may also include, in an embodiment, one or more communication interfaces 815 coupled to bus 802. A communication interface 818 provides a data communication coupling, typically two-way, to a network link 820 that is connected to a local network 822. For example, a communication interface 818 may be an integrated services digital network (ISDN) card, cable modem, satellite modem, or a modem to provide a data communication connection to a corresponding type of telephone line. As another example, the one or more communication interfaces 818 may include a local area network (LAN) card to provide a data communication connection to a compatible LAN. As yet another example, the one or more communication interfaces 818 may include a wireless network interface controller, such as a 802.11-based controller, Bluetooth controller, Long Term Evolution (LTE) modem, and/or other types of wireless interfaces. In any such implementation, communication interface 818 sends and receives electrical, electromagnetic, or optical signals that carry digital data streams representing various types of information.

Network link 820 typically provides data communication through one or more networks to other data devices. For example, network link 820 may provide a connection through local network 822 to a host computer 824 or to data equipment operated by a Service Provider 826. Service Provider 826, which may for example be an Internet Service Provider (ISP), in turn provides data communication services through a wide area network, such as the world-wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

In an embodiment, computer system 800 can send packets and receive data through the network(s), network link 820, and communication interface 818. In some embodiments, this data may be data units that the computer system 800 has been asked to process and, if necessary, redirect to other computer systems via a suitable network link 820. In other embodiments, this data may be instructions for implementing various processes related to the described techniques. For instance, in the Internet example, a server 830 might transmit a requested code for an application program through Internet 828, ISP 826, local network 822 and communication interface 818. The received code may be executed by processor 804 as it is received, and/or stored in storage device 810, or other non-volatile storage for later execution. As another example, information received via a network link 820 may be interpreted and/or processed by a software component of the computer system 800, such as a web browser, application, or server, which in turn issues instructions based thereon to a processor 804, possibly via an operating system and/or other intermediate layers of software components.

Computer system 800 may optionally be coupled via bus 802 to one or more displays 812 for presenting information to a computer user. For instance, computer system 800 may be connected via a High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 812 may include, without limitation, plasma display devices, projectors, cathode ray tube (CRT) monitors, electronic paper, virtual reality headsets, braille terminal, and/or any other suitable device for outputting information to a computer user. In an embodiment, any suitable type of output device, such as, for instance, an audio speaker or printer, may be utilized instead of a display 812.

One or more input devices 814 are optionally coupled to bus 802 for communicating information and command selections to processor 804. One example of an input device 814 is a keyboard, including alphanumeric and other keys. Another type of user input device 814 is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane. Yet other examples of suitable input devices 814 include a touch-screen panel affixed to a display 812, cameras, microphones, accelerometers, motion detectors, and/or other sensors. In an embodiment, a network-based input device 814 may be utilized. In such an embodiment, user input and/or other information or commands may be relayed via routers and/or switches on a Local Area Network (LAN) or other suitable shared network, or via a peer-to-peer network, from the input device 814 to a network link 820 on the computer system 800.

As discussed, computer system 800 may implement techniques described herein using customized hard-wired logic, one or more ASICs or FPGAs 803, firmware and/or program logic, which in combination with the computer system causes or programs computer system 800 to be a special-purpose machine. According to one embodiment, however, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid-state drive of a remote computer. The remote computer can load the instructions into its dynamic memory and use a modem to send the instructions over a network, such as a cable network or cellular network, as modulated signals. A modem local to computer system 800 can receive the data on the network and demodulate the signal to decode the transmitted instructions. Appropriate circuitry can then place the data on bus 802. Bus 802 carries the data to main memory 806, from which processor 804 retrieves and executes the instructions. The instructions received by main memory 806 may optionally be stored on storage device 810 either before or after execution by processor 804.

4.0. EXTENSIONS AND ALTERNATIVES

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the drawings, the various components are depicted as being communicatively coupled to various other components by arrows. These arrows illustrate only certain examples of information flows between the components. Neither the direction of the arrows nor the lack of arrow lines between certain components should be interpreted as indicating the existence or absence of communication between the certain components themselves. Indeed, each component may feature a suitable communication interface by which the component may become communicatively coupled to other components as needed to accomplish any of the functions described herein.

In the foregoing specification, embodiments of the inventive subject matter have been described with reference to numerous specific details that may vary from implementation to implementation. Thus, the sole and exclusive indicator of what is the inventive subject matter, and is intended by the applicants to be the inventive subject matter, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A system, comprising:
   a motherboard configured with a T-topology bus from a host controller to two or more Double Data Rate 5 (DDR5) Dual In-Line Memory Module (DIMM) slots;
   a DIMM terminator card, the DIMM terminator card inserted into one of the two or more DDR5 DIMM slots, the DIMM terminator card comprising a plurality of termination resistors for terminating data lines from the motherboard and a power management integrated circuit, the power management integrated circuit configured to regulate bias voltage output.

2. The system of claim 1, wherein the DIMM terminator card is passive.

3. The system of claim 1, wherein the DIMM terminator card is passive and further comprises:
   a DDR5 serial presence detect hub, the DDR5 serial presence detect hub configured to manage communications between devices in the DIMM terminator card.

4. The system of claim 1, wherein the DIMM terminator card is passive and
wherein the power management integrated circuit is programmable by the host controller.

5. The system of claim 1, wherein the DIMM terminator card is active and further comprises:
a bus sense controller, the bus sense controller configured to control active termination of the data lines from the motherboard.

6. The system of claim 1, wherein the DIMM terminator card is active and further comprises:
a bus sense controller, the bus sense controller configured to control active termination of data lines from the motherboard, the bus sense controller implements a low power mode.

7. The system of claim 1, wherein the DIMM terminator card is active and further comprises:
a bus sense controller, the bus sense controller configured to control active termination of data lines from the motherboard;
a DDR5 serial presence detect hub, the DDR5 serial presence detect hub configured to manage communications between the bus sense controller and other devices in the DIMM terminator card.

8. The system of claim 1, wherein the DIMM terminator card is active and further comprises:
a bus sense controller, the bus sense controller configured to control active termination of data lines from the motherboard.

9. The system of claim 1, wherein the DIMM terminator card is active and further comprises:
a bus sense controller, the bus sense controller configured to control active termination of data lines from the motherboard;
wherein the power management integrated circuit is programmable by the host controller.

10. The system of claim 1, wherein the DIMM terminator card is active and further comprises:
a plurality of variable resistor terminator circuits each coupled to a high-speed transistor;
wherein the host controller controls termination voltages via a register coupled to each high speed transistor.

11. A method, comprising:
implementing a T-topology bus on a motherboard from a host controller to two or more Double Data Rate 5 (DDR5) Dual In-Line Memory Module (DIMM) slots; one of the two or more DDR5 DIMM slots having a DIMM terminator card inserted, the DIMM terminator card comprising a plurality of termination resistors for terminating data lines from the motherboard and a power management integrated circuit, the power management integrated circuit regulates bias voltage output.

12. The method of claim 11, wherein the DIMM terminator card is passive.

13. The method of claim 11, wherein the DIMM terminator card is passive and wherein the DIMM terminator card includes a DDR5 serial presence detect hub, the DDR5 serial presence detect hub manages communications between devices in the DIMM terminator card.

14. The method of claim 11, wherein the DIMM terminator card is passive; wherein the power management integrated circuit is programmable by the host controller.

15. The method of claim 11, wherein the DIMM terminator card is active and wherein the DIMM terminator card includes a bus sense controller, the bus sense controller controls active termination of the data lines from the motherboard.

16. The method of claim 11, wherein the DIMM terminator card is active and wherein the DIMM terminator card includes a bus sense controller, the bus sense controller controls active termination of data lines from the motherboard, the bus sense controller implements a low power mode.

17. The method of claim 11, wherein the DIMM terminator card is active; wherein the DIMM terminator card includes a bus sense controller, the bus sense controller configured to control active termination of data lines from the motherboard; and wherein the DIMM terminator card includes a DDR5 serial presence detect hub, the DDR5 serial presence detect hub manages communications between the bus sense controller and other devices in the DIMM terminator card.

18. The method of claim 11, wherein the DIMM terminator card is active; wherein the DIMM terminator card includes a bus sense controller, the bus sense controller controls active termination of data lines from the motherboard.

* * * * *